United States Patent
McLaurin

(10) Patent No.: US 9,345,999 B2
(45) Date of Patent: May 24, 2016

(54) TOOL-LESS AUTO-ALIGNING FILTER RETENTION SYSTEM

(71) Applicant: Air System Components, Inc., Plano, TX (US)

(72) Inventor: Matthew Brent McLaurin, Carrollton, TX (US)

(73) Assignee: AIR SYSTEM COMPONENTS, INC., Plano, TX (US)

( * ) Notice: Subject to any disclaimer, the term of this patent is extended or adjusted under 35 U.S.C. 154(b) by 89 days.

(21) Appl. No.: 14/221,238

(22) Filed: Mar. 20, 2014

(65) Prior Publication Data

US 2014/0245706 A1    Sep. 4, 2014

Related U.S. Application Data

(63) Continuation of application No. 13/804,189, filed on Mar. 22, 2013.

(60) Provisional application No. 61/771,709, filed on Mar. 1, 2013, provisional application No. 61/804,500, filed on Mar. 22, 2013.

(51) Int. Cl.
*B01D 46/00* (2006.01)
*B01D 46/10* (2006.01)
*B01D 46/24* (2006.01)

(52) U.S. Cl.
CPC ........ *B01D 46/0005* (2013.01); *B01D 46/0002* (2013.01); *B01D 46/10* (2013.01); *B01D 46/2414* (2013.01); *B01D 2271/02* (2013.01); *B01D 2271/027* (2013.01)

(58) Field of Classification Search
CPC ............... B01D 46/0005; B01D 46/10; B01D 2271/027; B01D 46/0002; B01D 46/2414
USPC .................................. 55/490, 502–509, 385.2
See application file for complete search history.

(56) References Cited

U.S. PATENT DOCUMENTS

| | | | | |
|---|---|---|---|---|
| 6,117,202 | A * | 9/2000 | Wetzel | 55/385.2 |
| 7,261,757 | B2 * | 8/2007 | Duffy | 55/502 |
| 2012/0060455 | A1 * | 3/2012 | Lange | 55/497 |

* cited by examiner

*Primary Examiner* — Dung H Bui
(74) *Attorney, Agent, or Firm* — Jackson Walker LLP; Christopher J. Rourk

(57) ABSTRACT

A filter retention system for releasably retaining a filter cartridge in an operable position within air supply and air exhaust systems is comprised of a filter cartridge, filter retainers, mounting frame with integral sealing knife edge and filter alignment brackets. The filter retainers allow for installation and removal of the filter cartridge without the use of tools. The retention system automatically aligns filter cartridges such that an airtight seal is created between the sealant containing groove in the filter cartridge and the sealing knife edge of the retention system.

20 Claims, 15 Drawing Sheets

TOOL-LESS AUTO-ALIGNING FILTER RETENTION SYSTEM

RELATED APPLICATIONS

The present application is a continuation of U.S. Ser. No. 13/804,189, filed on Mar. 22, 2013, which claims benefit of U.S. Ser. No. 61/771,709 filed on Mar. 1, 2013, and the present application also claims benefit of U.S. Ser. No. 61/804,500 filed Mar. 22, 2013, all of which are hereby incorporated by reference for all purposes.

TECHNICAL FIELD

The present disclosure relates generally to air handling systems, and more specifically to a tool-less auto-aligning filter retention system that releasably retains a filter cartridge in an operable position within air supply and air exhaust systems.

BACKGROUND OF THE INVENTION

Filters used in clean room environments are difficult and time consuming to change, and often cause the clean room environment to be contaminated during the changing process.

SUMMARY OF THE INVENTION

A filter retention system for releasably retaining a filter cartridge in an operable position within air supply and air exhaust systems is comprised of a filter cartridge, filter retainers, mounting frame with integral sealing knife edge and filter alignment brackets. The filter retainers allow for installation and removal of the filter cartridge without the use of tools. The retention system automatically aligns filter cartridges such that an airtight seal is created between the sealant containing groove in the filter cartridge and the sealing knife edge of the retention system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
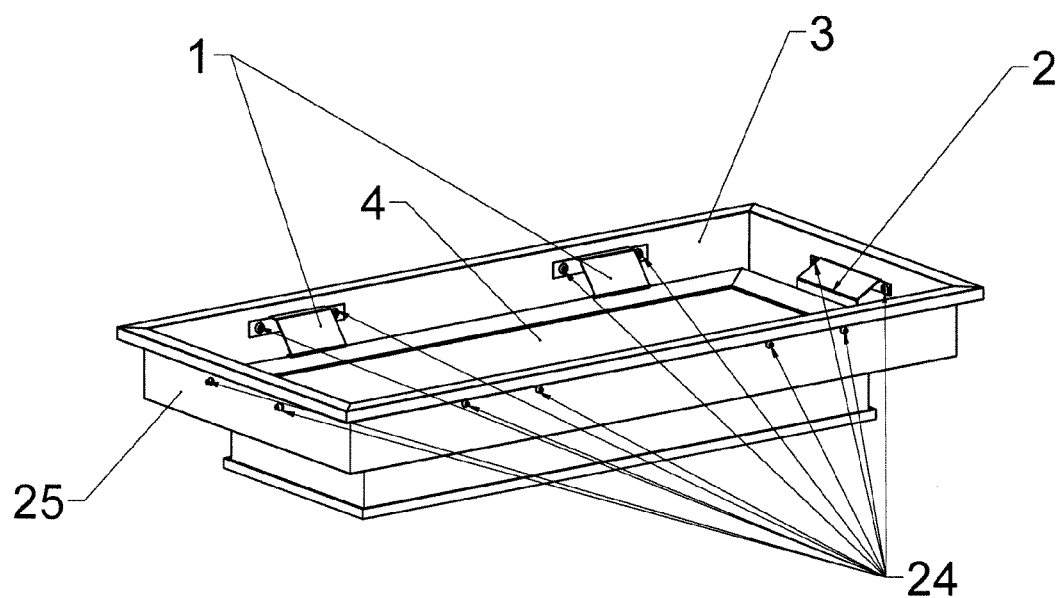
FIG. 1 is a diagram of filter retention system in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure relates to a filter alignment and retention system for installing filter cartridges that have a sealant containment groove which can be used in systems with a sealing knife edge or in other suitable applications. Such filters can be used in many different applications for contamination control, such as in manufacturing clean rooms, medical operating rooms, medical diagnostic rooms, medical treatment suites, pharmacies, and in other locations where it is necessary to control contamination. The filter cartridges used in these applications remove particulates from the air at a predetermined efficiency for a specified minimum particle size.

The United States National Institutes of Health (NIH) and American Society of Heating, Refrigerating and Air Conditioning Engineers (ASHRAE) have conducted research in medical operation suites that has shown that a properly designed laminar flow ventilation system can reduce the number of airborne particles that come in contact with a surgical site. This research further establishes that a correlation exists between the number of airborne particles and the rate of surgical site infections. NIH and ASHRAE have set forth design requirements for such systems, including minimum filtration requirements, supply diffuser type, minimum area of laminar flow coverage, return/exhaust location, air change rate, and room air temperature. In many installations, the laminar flow diffusers have high efficiency particulate air (HEPA) or ultra-low penetration air (UPLA) filter cartridges installed to fulfill the requirements of these designs.

In clean rooms and other contamination-controlled facilities, the number of particles per cubic foot of a specific size determines the contamination level. The maximum quantity and particle size are specified in ISO standards. The contamination level is generally proportional to the number of air changes per hour. As the air change rate increases the room becomes "cleaner," and requires a larger quantity of filters.

In order to minimize contamination, filter cartridges should be installed in the supply air diffusers, the ceiling grid system (when a supply plenum is used), or in the return/exhaust air grille. This arrangement prevents contamination from the ductwork from entering into the room, and prevents contamination of the ductwork that is downstream from a filtered exhaust grille.

When in operation, particulates will be captured and retained by the media of the filter cartridges, which increases the pressure drop across the filter cartridge. The period of useful operation for a filter cartridge is not fixed, and is instead typically determined by when the pressure drop across the filter reaches a predetermined maximum allowable pressure drop, although it can also be based on predetermined maximum time in use, a predetermined number of procedures/processes that have been completed in the space, or other suitable metrics that have some correlation to an increase in pressure drop. Once a filter cartridge has reached the maximum pressure drop or other suitable limit set for useful operation, it must be replaced.

Clean rooms and other contamination-controlled facilities will typically have a significant quantity of filter cartridges installed to meet the required regulations and standards for their operation. Typically, all filters in a given space require replacement at the same time. Replacing each filter cartridge typically involves removing a large number of brackets by extracting screw/nut type fasteners, replacing the filter, and then re-installing the brackets, which is a repetitive, time consuming process that requires multiple technicians to safely complete removal of the old filters and installation of the new filters. If the new filters are not aligned correctly, a proper seal (such as may be verified through testing in accordance with IEST recommended practices) will not be established between the knife edge and filter cartridge sealant, and the filter must be reinstalled or adjusted and retested, which can result in further delay.

Moreover, when the filter cartridge is released from the filter retention system, the "seal" between the room and the contaminated plenum/ductwork is broken. After a new filter cartridge is installed, the "seal" is restored, but the room has now been contaminated by air and particulates from the contaminated area. As a result, the entire room must be decontaminated before the room can be used again, which is a costly and time-consuming process. The longer that the filter changing process takes, the longer it will take to decontaminate the room.

Therefore, there is a need for a filter retention system that allows an old filter cartridge to be removed quickly and that can automatically align a new filter cartridge for proper installation, to reduce the man-hours and overall time required for replacement of the filter cartridges.

The present disclosure provides a filter retention system that allows an old filter cartridge to be quickly removed and a new filter cartridge to be quickly installed without the use of tools, while ensuring proper alignment of the filter cartridge sealant with the sealing knife edge. The filter retention system of the present disclosure can be used to remove contaminates from air that is supplied to a space or exhausted from a space. In the majority of applications, the filter retention system of the present disclosure can be used as a component of an air distribution device. These devices can include an opening to receive the filter retention system with the filter cartridge installed and an opening for connection to supply/exhaust duct. In other applications, the filter retention system of the present disclosure can be mounted in a grid system with a single plenum supplying or exhausting air from the space.

The filter retention system can be fastened or otherwise secured to a mounting frame and can mechanically retain a filter cartridge while meeting the leakage requirements for the specific filter type, as noted in IEST recommended practice CC034: HEPA and ULPA Filter Leak Tests, under typical operating conditions. Typical filter cartridges can be operated with face velocities of up to 150 feet per minute and to a final resistance of 2.0 inches water gauge, or to other suitable design criteria.

In one exemplary embodiment, the filter retention system can include a plurality of filter alignment brackets that can be permanently attached to the filter retention system, to ensure proper alignment of the filter cartridges during installation and operation. The filter retention system can include a sealing knife edge that is integral to the mounting frame to ensure that air leakage does not occur. The filter cartridge can include sealant, such as a bed of material that does not harden and dry, and which can permanently stick to the hollow inner surface of the filter cartridge frame. Examples of suitable sealant materials include silicon gel, polyurethane gel, polymeric gel, or other suitable materials.

Proper alignment of the filter cartridge is achieved when the sealing knife edge extends into the hollow of the filter cartridge containing the filter cartridge sealant and subsequently into the filter cartridge sealant, with the peripheral edge of the sealing knife edge of the filter retention system being inserted into the filter cartridge sealant, and contacting only the filter cartridge sealant and not the filter housing, which can cause the seal to fail.

The present disclosure provides a simple, secure, and effective system to retain high efficiency filter cartridges, and which also allows for installation and removal of a filter cartridge without the use of tools. The present disclosure expedites removal, replacement and installation of high efficiency filter cartridges, substantially reducing the period of time of non-operation of the filter system in spaces where the filter system is installed. For ceiling mounted diffuser sizes up to 2 feet by 4 feet, this process can be accomplished by a single person.

Another feature of the present disclosure is that it facilitates proper alignment of the filter cartridge during installation, which helps to eliminate leakage at the interface of the filter cartridge sealant and the sealing knife edge. These and other features are attained by the filter retention system therefor, as described below in various exemplary embodiments and as shown in the drawings.

FIG. 1 is a diagram of filter retention system 25 in accordance with an exemplary embodiment of the present disclosure. Filter cartridge 4 is secured to filter retention system 25 by four filter retainer clips 1 and is aligned by the retainer clips 1 and two filter alignment brackets 2. System mounting frame 3 incorporates the sealing knife edge 14 (not explicitly shown), which creates a seal with the filter cartridge sealant 12 (not explicitly shown). Rivets 24 are used to secure filter retainer clips 1 and filter alignment brackets 2 to system mounting frame 3.

Figure 2:
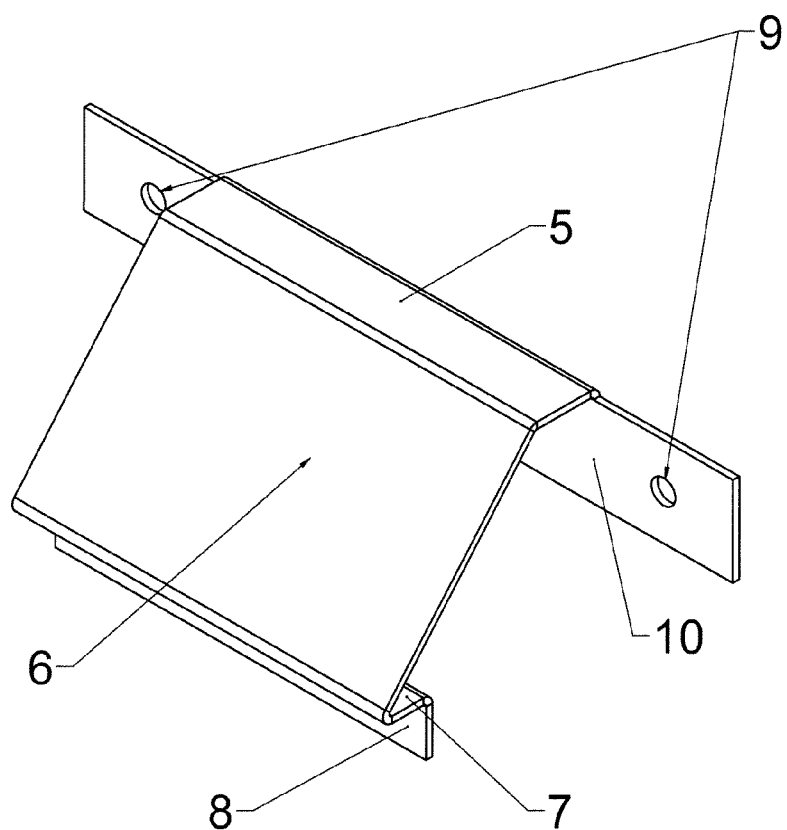
FIG. 2 is a perspective view of a filter retainer clip in accordance with an exemplary embodiment of the present disclosure.

FIG. 2 is a perspective view of filter retainer clip in accordance with an exemplary embodiment of the present disclosure. Surface 6 of filter retainer clip 1 and surface 15 of filter alignment bracket 2 (not explicitly shown) facilitate proper alignment of filter cartridge 4 during installation, by guiding filter cartridge 4 into a proper position as it is inserted into filter retention system 25. In particular, filter retainer clip 1 deforms in the direction towards system mounting frame 3 until filter cartridge 4 passes surface 6, at which point filter retainer clip 1 springs back into position to lock against filter cartridge 4. Surface 8 of filter retainer clip 1 and surface 16 of filter alignment bracket 2 restrict movement of filter cartridge frame 13, which helps to ensure that filter cartridge 4 is properly aligned when it is installed. Likewise, during removal, filter retainer clip 1 is moved by asserting a force on surface 6, such as by manual application of force, until filter cartridge 4 can be moved past filter retainer clip 1.

Figure 3:
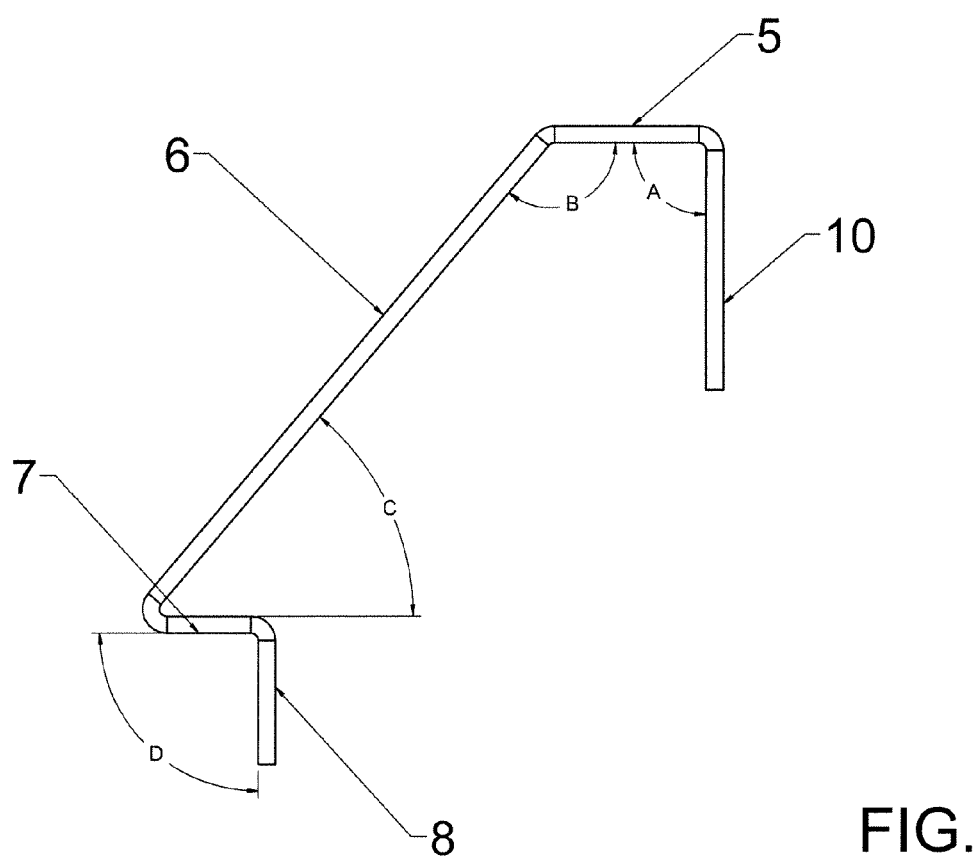
FIG. 3 is a side view of a filter retainer clip in accordance with an exemplary embodiment of the present disclosure.

FIG. 3 is a side view of filter retainer clip 1 in accordance with an exemplary embodiment of the present disclosure. Filter retainer clip 1 is formed in a particular shape to facilitate tool-less installation and removal, and to ensure proper alignment of filter cartridge 4. Filter retainer clip 1 can be formed from a single piece of material, preferably of sheet steel (such as #302 stainless steel or spring steel, 0.03" to 0.01" thick or other suitable materials) formed by punching a blank from sheet stock and then by bending the blank along four bend lines to form five segments (base segment 10, second segment 5, third segment 6, fourth segment 7 and fifth segment 8) in series at specific angles to one another.

As shown in FIG. 3, second segment 5 subtends an angle A in the range of 88° to 95°, and preferably about 90°, with base segment 10. Third segment 6 subtends an obtuse angle B in the range of 125° to 135°, and preferably about 130°, with second segment 5. Fourth segment 7 subtends an acute angle C in the range of 48° to 52°, and preferably about 50°, with third segment 6. Fifth segment 8 subtends an angle D in the range of 88° to 95°, and preferably about 90°, with fourth segment 7.

Base segment 10 has protruding tabs with hole 9 in each to fasten filter retainer clip 1 to system mounting frame 3 with rivets 24 or in other suitable manners. Third segment 6 is gauged and angled to flex when a force is applied, allowing for installation and removal of filter cartridge 4.

Figure 4:
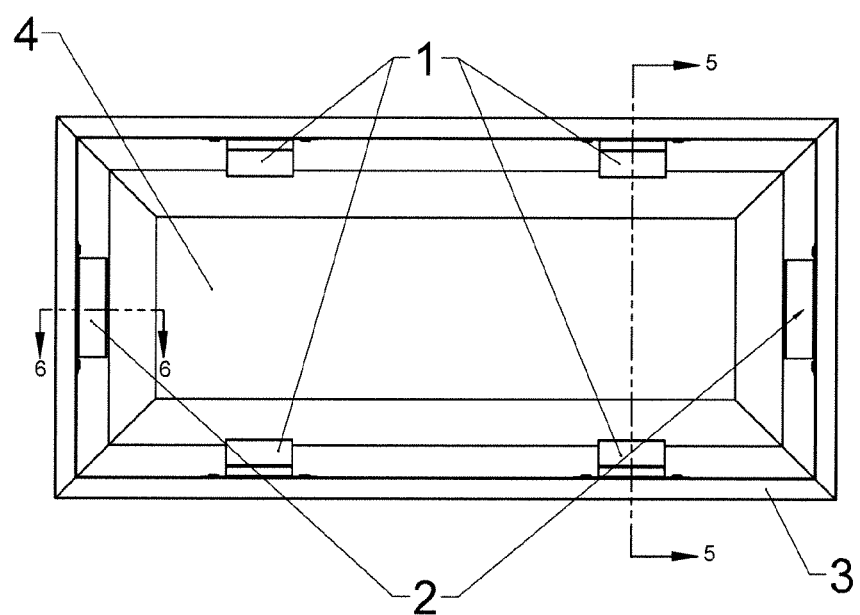
FIG. 4 is a plan view of a filter cartridge installed in a system mounting frame, in accordance with an exemplary embodiment of the present disclosure.

FIG. 4 is a plan view of filter cartridge 4 installed in system mounting frame 3, in accordance with an exemplary embodiment of the present disclosure. As can be seen in FIG. 4, four filter retainer clips 1 and two filter alignment brackets 2 hold filter cartridge 4 in position within system mounting frame 3, and the four filter retainer clips 1 further secure filter cartridge 4 against system mounting frame 4.

Figure 5:
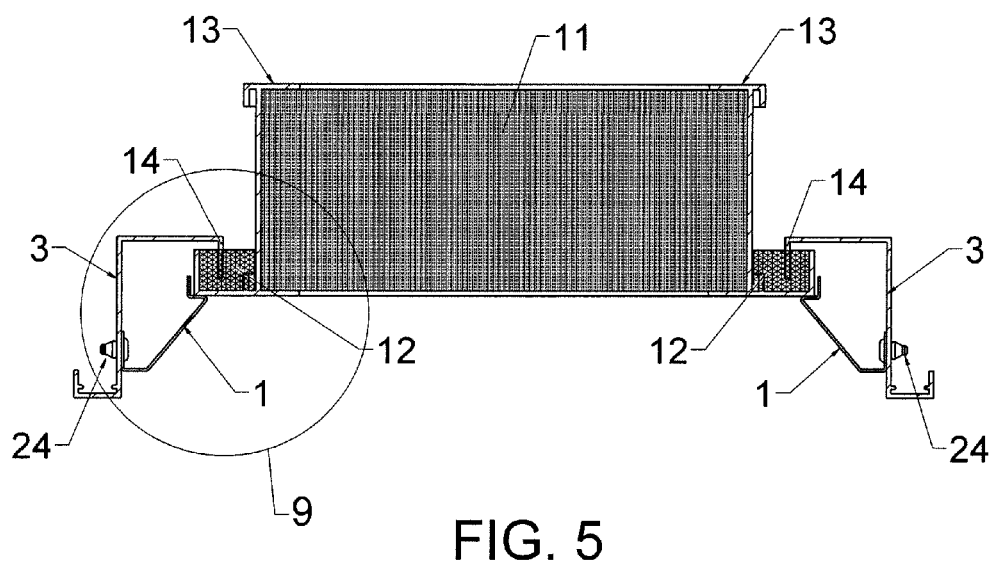
FIG. 5 is a sectional view taken of a filter cartridge, in accordance with an exemplary embodiment of the present disclosure.

FIG. 5 is a sectional view taken on the plane 5-5 in FIG. 4, in accordance with an exemplary embodiment of the present disclosure. As shown in FIG. 5, sealing knife edge 14 penetrates filter cartridge sealant 12 in the center of the sealant as a function of angle B and third segment 6 of filter retainer clip 1. Filter cartridge frame 13 as shown contains filter material 11. Filter retainer clips 1 are held in position by rivets 24 or in other suitable manners, and hold filter cartridge 4 in position within system mounting frame 3.

Figure 6:
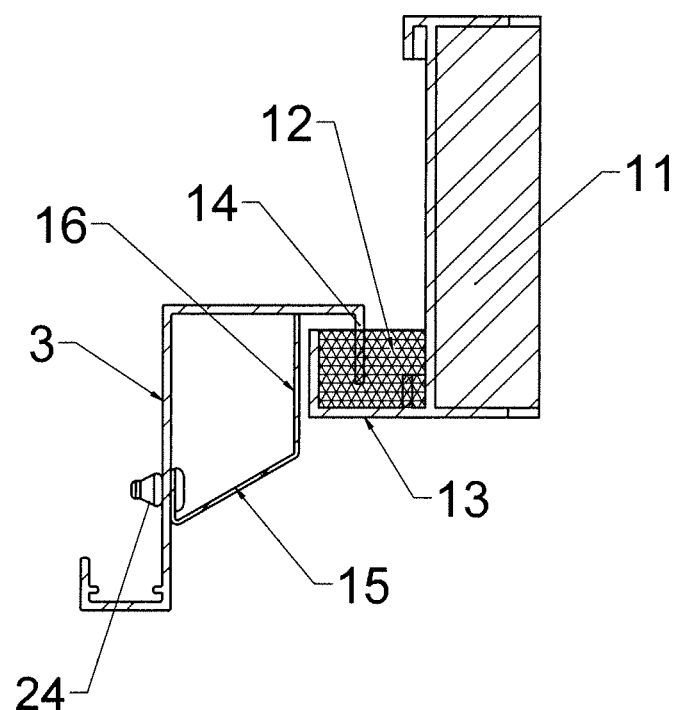
FIG. 6 is a sectional view taken of a filter cartridge, in accordance with an exemplary embodiment of the present disclosure.

FIG. 6 is a sectional view taken on the plane 6-6 in FIG. 4, in accordance with an exemplary embodiment of the present disclosure. FIG. 6 shows filter cartridge 4 in its installed position with sealing knife edge 14 penetrating filter cartridge sealant 12 as a function of angle E and third segment 16 of filter alignment bracket 2, which controls the location of filter cartridge 4 within system mounting frame 3. In this manner, sealing knife edge 14 extends into the hollow of the frame of filter cartridge 4 that contains filter cartridge sealant 12. Rivet 12 holds filter alignment bracket 2 in position.

Figure 7:
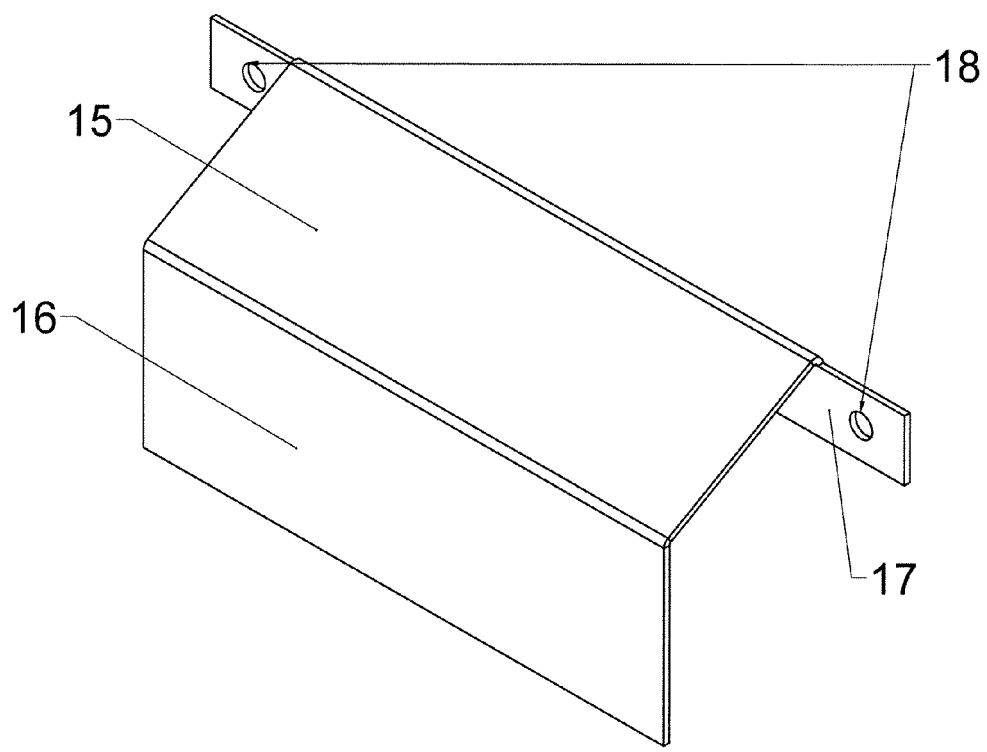
FIG. 7 is a perspective view of a filter alignment bracket, in accordance with an exemplary embodiment of the present disclosure.

FIG. 7 is a perspective view of filter alignment bracket 2, in accordance with an exemplary embodiment of the present disclosure. Filter alignment bracket 2 can be formed from a single piece of austenitic stainless steel, cold rolled steel or aluminum, 0.03" to 0.01" thick, or other suitable materials. Filter alignment bracket 2 can be formed by punching a blank from sheet stock and then by bending the blank along two bend lines to form three segments (base segment 17, second segment 15 and third segment 16) in series at specific angles to one another. Base segment 17 has protruding tabs with a hole 18 in each to allow filter alignment bracket 2 to be secured to system mounting frame 3 by rivets 24, or in other suitable manners. Second segment 15 and third segment 16 are gauged and angled to restrict the movement of filter cartridge 4 during installation, to ensure that sealing knife edge 14 extends into the hollow of filter cartridge frame 13 that contains filter cartridge sealant 12 and into filter cartridge sealant 12, with the peripheral edge of sealing knife edge 14 within filter cartridge sealant 12, and contacting only filter cartridge sealant 12. In this manner, an air-tight seal is formed.

Figure 8:
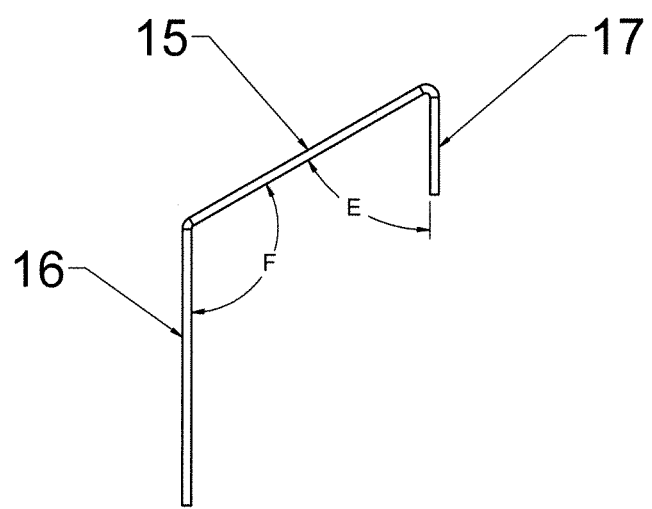
FIG. 8 is a side view of a filter alignment bracket, in accordance with an exemplary embodiment of the present disclosure.

FIG. 8 is a side view of filter alignment bracket 2, in accordance with an exemplary embodiment of the present disclosure. As shown in FIG. 8, second segment 15 subtends an acute angle E in the range of 45° to 80°, and preferably about 60°, relative to base segment 17. Third segment 16 subtends an obtuse angle B in the range of 100° to 135°, and preferably about 120°, relative to second segment 15.

Figure 9:
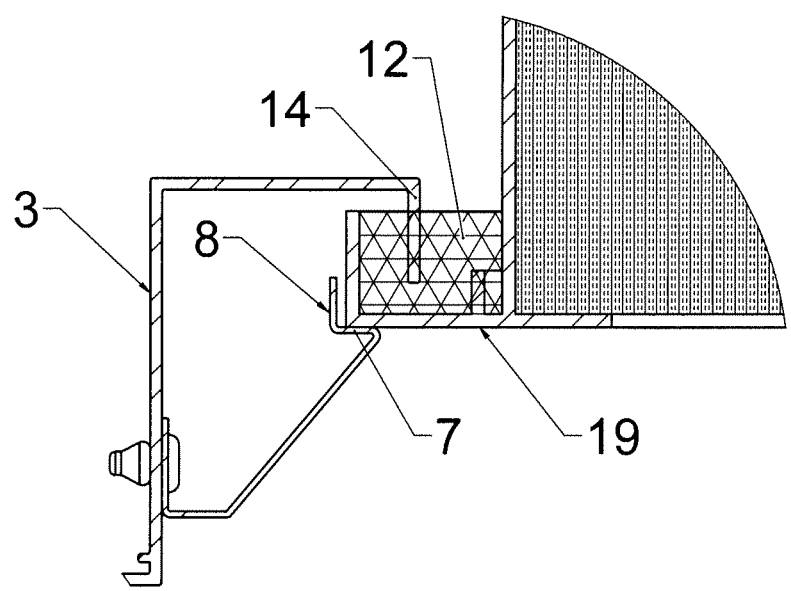
FIG. 9 is a detail view of an installed filter cartridge in accordance with an exemplary embodiment of the present disclosure.

FIG. 9 is a detail view of an installed filter cartridge 4 in accordance with an exemplary embodiment of the present disclosure. Fourth segment 7 of filter retainer clip 1 makes contact with horizontal portion 19 of filter cartridge frame 13 in order to retain filter cartridge 4 when it is used in a supply configuration. Fifth segment 8 restricts the location of filter cartridge 4, ensuring that sealing knife edge extends into the hollow of filter cartridge frame 13 that contains filter cartridge sealant 12, and into filter cartridge sealant 12 with the peripheral edge of sealing knife edge 14 within filter cartridge sealant 12 contacting only filter cartridge sealant 12. In this manner, an air tight seal is formed.

After filter retainer clip 1 deflects sufficiently, fifth segment 8 contacts system mounting frame 3 and prevents further deflection. This configuration protects filter retainer clip 1 from damage caused by plastic deformation. Filter retainer clip 1 can be formed of a suitable material, segment angles, width and thickness that are selected so as to securely retain filter cartridge 4 when filter face velocities are equal to or less than 150 feet per minute and the pressure drop across filter cartridge 4 is equal to or less than 2.0 inches water gauge, and allows for installation and deliberate removal of filter cartridge 4 without the use of tools.

Figure 10:
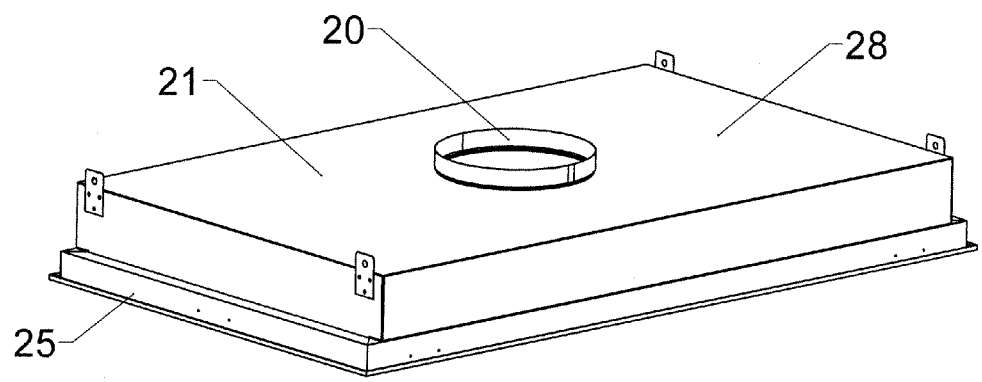
FIG. 10 is a perspective view of an air distribution device incorporating a filter retention system in accordance with an exemplary embodiment of the present disclosure.

FIG. 10 is a perspective view of air distribution device 28 incorporating filter retention system 25 in accordance with an exemplary embodiment of the present disclosure. In this exemplary embodiment, filter retention system 25 can be implemented as a part of air distribution device 28 for supply or exhaust air operation. Sealed plenum 21 of air distribution device 28 includes duct connection 20, which is used to connect air distribution device 28 to a heating, ventilating and air conditioning (HVAC) system.

Figure 11:
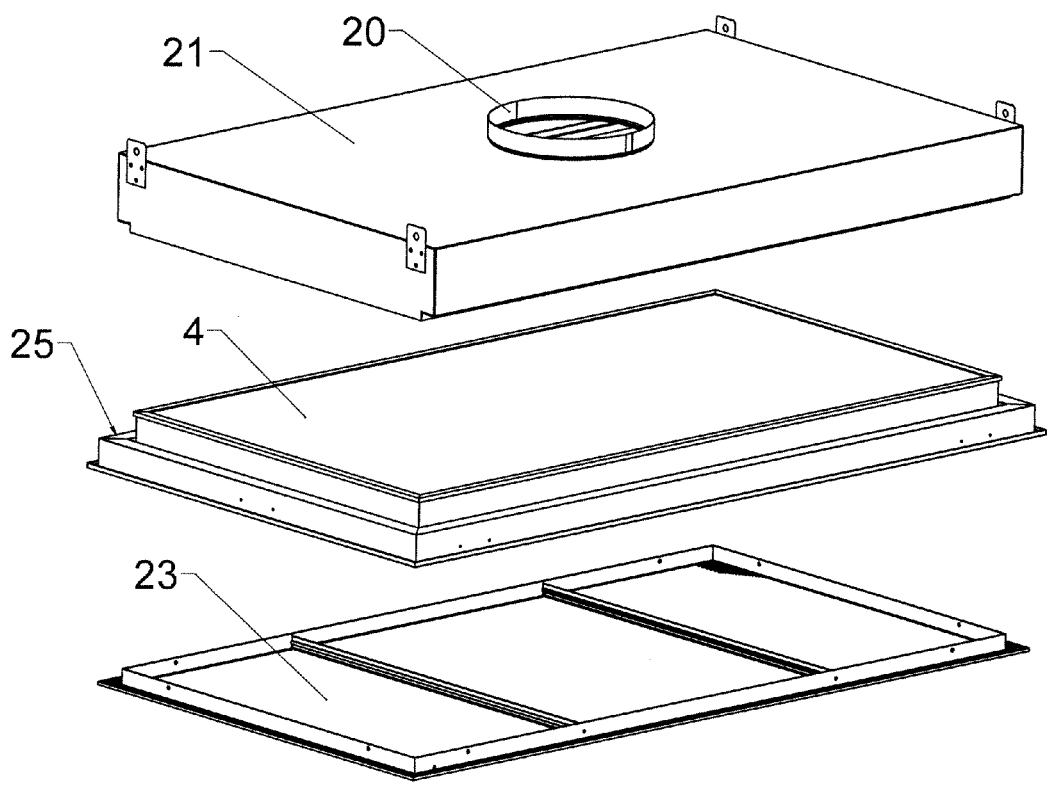
FIG. 11 is an exploded view of an air distribution device in accordance with an exemplary embodiment of the present disclosure.

FIG. 11 is an exploded view of air distribution device 28 in accordance with an exemplary embodiment of the present disclosure. Device face 23 of air distribution device 28 determines the air flow pattern that will be delivered when supplying filtered air to a space. Filter retention system 25 holds filter cartridge 4 in position within air distribution device 28.

Figure 12:
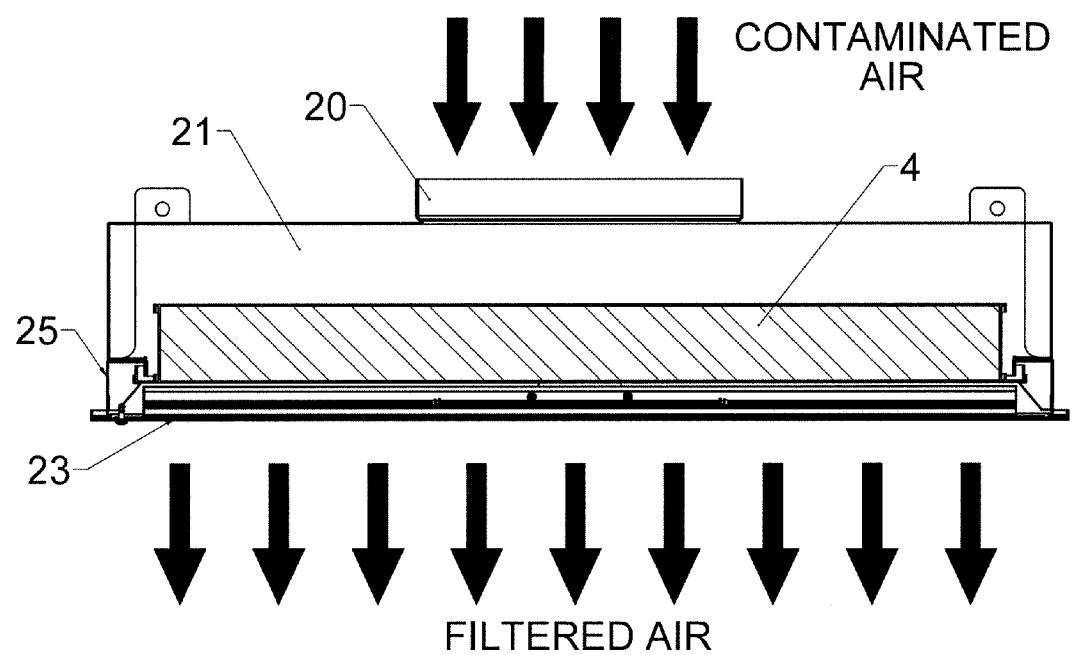
FIG. 12 is a section view of an air distribution device, in accordance with an exemplary embodiment of the present disclosure.

FIG. 12 is a section view of air distribution device 28, in accordance with an exemplary embodiment of the present disclosure. In this exemplary embodiment, air distribution device 28 receives contaminated air through duct connection 20 and provides filtered air to a ventilated space. Filter cartridge 4 is contained within sealed plenum 21 and filter retention system 25, and delivers the filtered air to the ventilated space through device face 23, which can be covered with a suitable material, such as a stainless steel grill.

Figure 13:
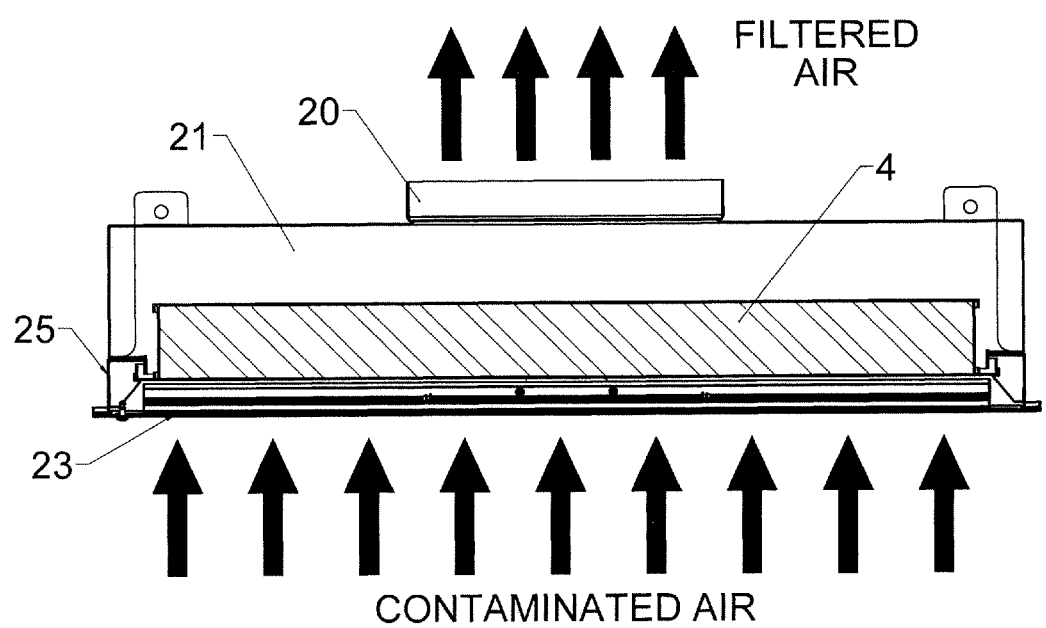
FIG. 13 is a section view of an air distribution device in exhaust operation, in accordance with an exemplary embodiment of the present disclosure.

FIG. 13 is a section view of air distribution device in exhaust operation, in accordance with an exemplary embodiment of the present disclosure. In this exemplary embodiment, air distribution device 28 receives contaminated air through device face 23 and provides filtered air to duct connection 20. Filter cartridge 4 is contained within sealed plenum 21 and filter retention system 25, and delivers the filtered air to the duct through duct connection 20.

Figure 14:
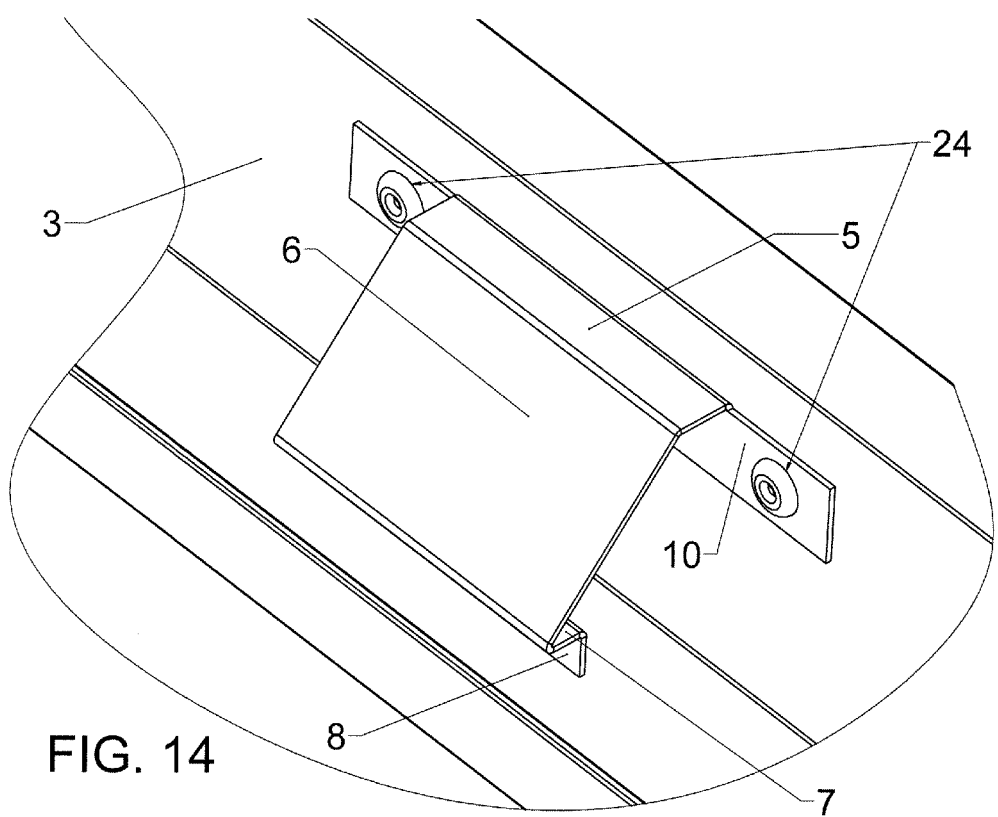
FIG. 14 is a perspective view of a filter retainer clip installed in a filter retention system, in accordance with an exemplary embodiment of the present disclosure.

FIG. 14 is a perspective view of filter retainer clip 2 installed in filter retention system 25, in accordance with an exemplary embodiment of the present disclosure. Filter retainer clip 2 is secured to system mounting frame 3 by rivets 24, which are installed through holes in base segment 10. Second segment 5, third segment 6 and fourth segment 7 form a spring that allows a filter cartridge 4 to be installed and locked into position by filter retainer clip 2.

Figure 15:
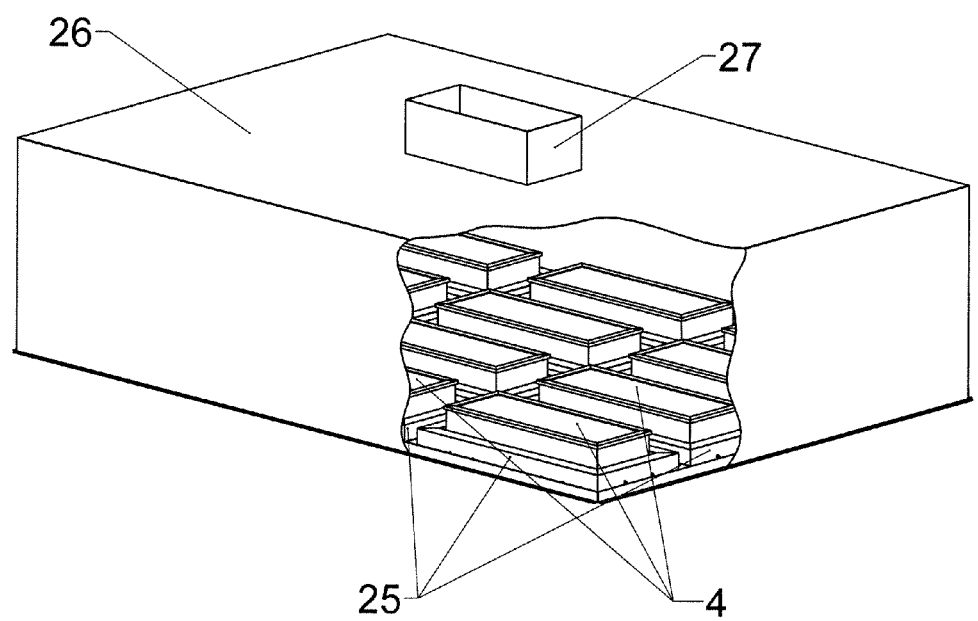
FIG. 15 is a perspective view of multiple filter retention systems installed within a single sealed plenum, in accordance with an exemplary embodiment of the present disclosure.

FIG. 15 is a perspective view of multiple filter retention systems 25 installed within a single sealed plenum 26, in accordance with an exemplary embodiment of the present disclosure. Sealed plenum 26 is attached to a grid system for mounting the filter retention systems 25 and has a duct connection 27. This application can be used to either supply or exhaust air from the space.

It may be appreciated that the components of the system as described above are the exemplary embodiments of the present disclosure, and that many design changes may be made without affecting the utility of these components. For example the choice of material for the filter alignment brackets and the mounting frame is a matter for the designer, who will take into account to the application of the air flow device the filter retention system is installed in. Also, while the segments of the filter retainer clip and filter alignment brackets are straight, some of the segments might be curved.

Since the present disclosure is subject to modifications and variations, it is intended that the forgoing description and the accompanying drawings shall be interpreted as only illustrative of the present disclosure defined by the following claims.

What is claimed is:

1. A filter retention system comprising:
a filter mounting frame configured to be secured to a ventilation system, the filter mounting frame comprising a knife edge periphery configured to be inserted into a sealing compound of a filter cartridge;
a plurality of filter retention clips coupled to the filter mounting frame above the knife edge periphery, each of the filter retention clips being configured to be displaced from a rest position when the filter cartridge is placed against the plurality of filter retention clips and a force is applied to the filter cartridge until the filter cartridge is in a predetermined position, each of the filter retention clips being configured to return to the rest position and to secure the filter cartridge in the predetermined position after the filter cartridge is in the predetermined position; and
a plurality of filter alignment brackets coupled to the filter mounting frame above the knife edge periphery and extending below the knife edge periphery, each of the filter alignment brackets being configured to guide the filter cartridge into the predetermined position;
wherein each of the filter retention clips comprises a single piece of resilient material forming five segments in series, a base segment connected to the mounting frame and is configured to removably clip onto the filter cartridge when it is placed into the frame, a second segment subtending a right included angle with the base segment and is configured to removably clip onto the filter cartridge after the knife edge periphery of the filter mounting frame is inserted into the sealing compound of a filter cartridge a predetermined distance, a third segment subtending an obtuse included angle with the second segment and is configured to bend so as to allow the filter cartridge to be inserted into the filter mounting frame, a fourth segment subtending an acute included angle with the third segment and is configured to bend so as to allow the filter cartridge to be inserted into the filter mounting frame and to return to position to lock the filter cartridge into position after it is inserted into the filter mounting frame, and a fifth segment subtending and included right angle with the fourth segment and is configured to bend so as to allow the filter cartridge to be inserted into the filter mounting frame and to return to position to lock the filter cartridge into position after it is inserted into the filter mounting frame and the knife edge periphery of the filter mounting frame is inserted into the sealing compound of a filter cartridge a predetermined distance.

2. The filter retention system of claim 1 wherein each of the filter alignment brackets further comprises a single piece of resilient material forming three segments in series.

3. The filter retention system of claim 2 wherein each of the filter alignment brackets further comprises a base segment connected to the mounting frame.

4. The filter retention system of claim 3 wherein each of the filter alignment brackets further comprises a second segment subtending an acute included angle with the base segment.

5. The filter retention system of claim 4 wherein each of the filter alignment brackets further comprises a third segment subtending an obtuse included angle with the second segment.

6. The filter retention system of claim 1 wherein each of the plurality of filter retention clips is knitted of the resilient material having the segment angles, a width and a thickness that are selected so as to allow for deflection of the retention clip without the use of tools, allowing for deliberate installation and removal of the filter cartridge without damage to the filter cartridge or any part of the filter retention system.

7. The filter retention system of claim 6, wherein the resilient material, the segment angles, the width and the thickness are selected so as to allow for deflection of each of the plurality of filter retention clips without plastic deformation.

8. The filter retention system of claim 6, wherein the resilient material, the segment angles, the width and the thickness are selected so as to securely retain the filter cartridge when operated within typical operational limits.

9. The filter retention system of claim 6, wherein the resilient material, the segment angles, the width and the thickness are selected so as to restrict the movement of the filter cartridge during installation to ensure proper alignment of a filter cartridge sealant on the sealing knife edge.

10. A filter retention clip for a filter retention system, comprising:
a base segment configured to be connected to a frame of the filter retention system;

a second segment subtending a right included angle with the base segment;

a third segment subtending an obtuse included angle with the second segment;

a fourth segment subtending an acute included angle with the third segment; and a fifth segment subtending a right included angle with the fourth segment;

wherein the filter retention clip is formed of a resilient material having segment angles, a width and a thickness that are selected so as to allow for deflection of the retention clip without the use of tools, allowing for deliberate installation and removal of a filter cartridge without damage to the filter cartridge or any part of the filter retention system, wherein the resilient material, the segment angles, the width and the thickness are selected so as to allow for deflection of the filter retention clip without plastic deformation when a filter cartridge is inserted into the filter mounting frame to a point at which a knife edge of the filter mounting frame is inserted a predetermined distance into a sealing compound disposed around a periphery of the filter cartridge.

11. The filter retention clip of claim 10, wherein the resilient material, the segment angles, the width and the thickness are selected so as to securely retain the filter cartridge when operated within typical operational limits.

12. A filter retention system comprising:
a filter mounting frame;
filter alignment brackets; and
a filter retention clip comprising:
   a base segment configured to be connected to a frame of the filter retention system;
   a second segment subtending a right included angle with the base segment;
   a third segment subtending an obtuse included angle with the second segment;
   a fourth segment subtending an acute included angle with the third segment; and
   a fifth segment subtending a right included angle with the fourth segment;
   wherein the filter retention clip is formed of a resilient material having segment angles, a width and a thickness that are selected so as to allow for deflection of the retention clip without the use of tools, allowing for deliberate installation and removal of a filter cartridge without damage to the filter cartridge or any part of the filter retention system, wherein the resilient material, the segment angles, the width and the thickness are selected so as to allow for deflection of the filter retention clip without plastic deformation when a filter cartridge is inserted into the filter mounting frame to a point at which a knife edge of the filter mounting frame is inserted a predetermined distance into a sealing compound disposed around a periphery of the filter cartridge.

13. The filter retention system of claim 12 wherein each of the filter alignment brackets further comprises a single piece of resilient material forming three segments in series.

14. The filter retention system of claim 12 wherein each of the filter alignment brackets further comprises a base segment connected to the filter mounting frame.

15. The filter retention system of claim 14 wherein each of the filter alignment brackets further comprises a second segment subtending an acute included angle with the base segment.

16. The filter retention system of claim 15 wherein each of the filter alignment brackets further comprises a third segment subtending an obtuse included angle with the second segment.

17. The filter retention system of claim 12 wherein each of the plurality of filter retention clips is formed of the resilient material having the segment angles, a width and a thickness that are selected so as to allow for deflection of the retention clip without the use of tools, allowing for deliberate installation and removal of the filter cartridge without damage to the filter cartridge or any part of the filter retention system.

18. The filter retention system of claim 17, wherein the resilient material, the segment angles, the width and the thickness are selected so as to allow for deflection of each of the plurality of filter retention clips without plastic deformation.

19. The filter retention system of claim 17, wherein the resilient material, the segment angles, the width and the thickness are selected so as to securely retain the filter cartridge when operated within typical operational limits.

20. The filter retention system of claim 17, wherein the resilient material, the segment angles, the width and the thickness are selected so as to restrict the movement of the filter cartridge during installation to ensure proper alignment of a filter cartridge sealant on the sealing knife edge.

* * * * *